Jan. 15, 1935.  A. E. LINENDOLL ET AL  1,987,692
LIGHT TESTING APPARATUS
Filed May 6, 1929   3 Sheets-Sheet 1

Inventors
Asa E. Linendoll
David F. Graham
By Owen & Owen
Attorneys

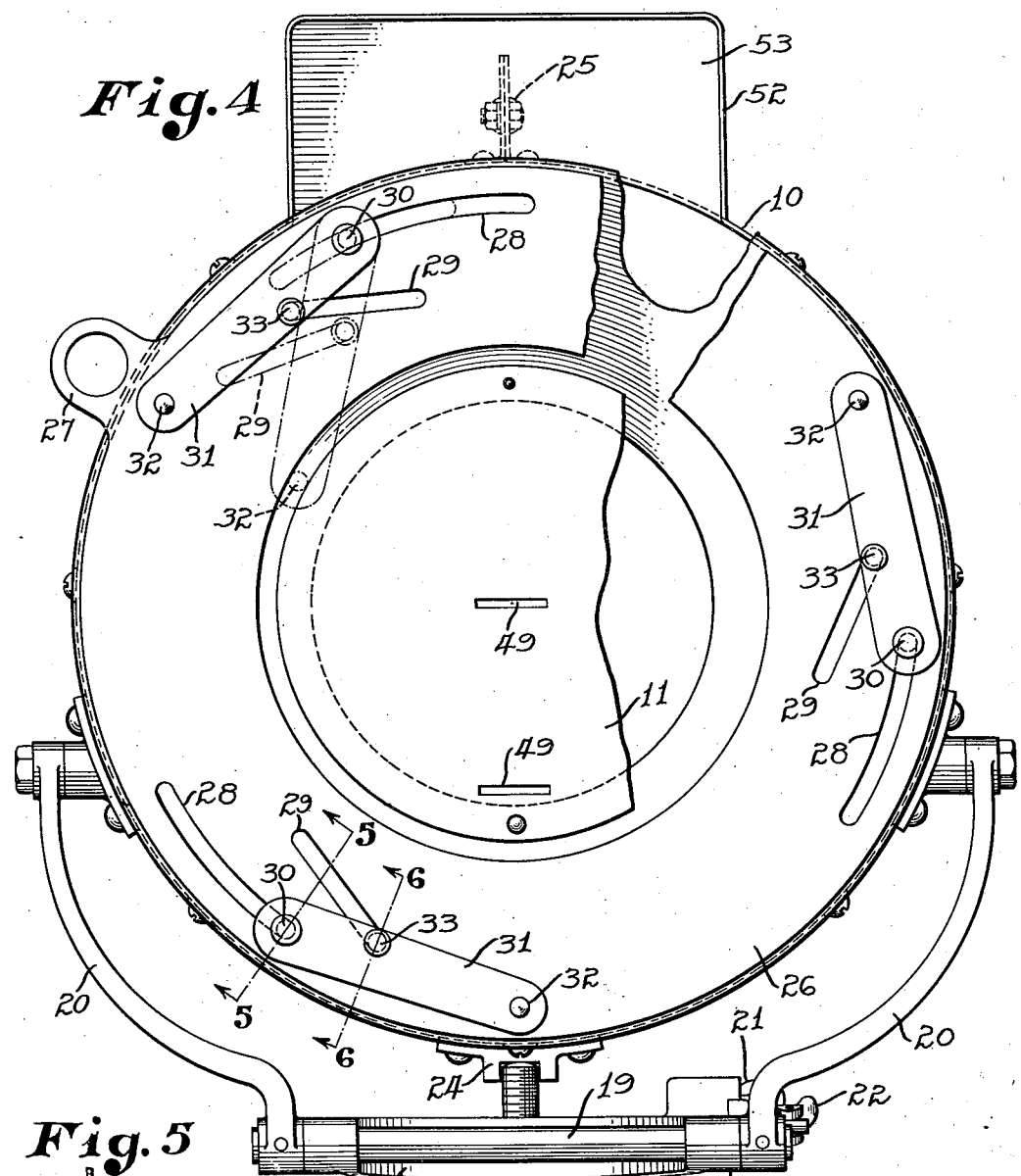

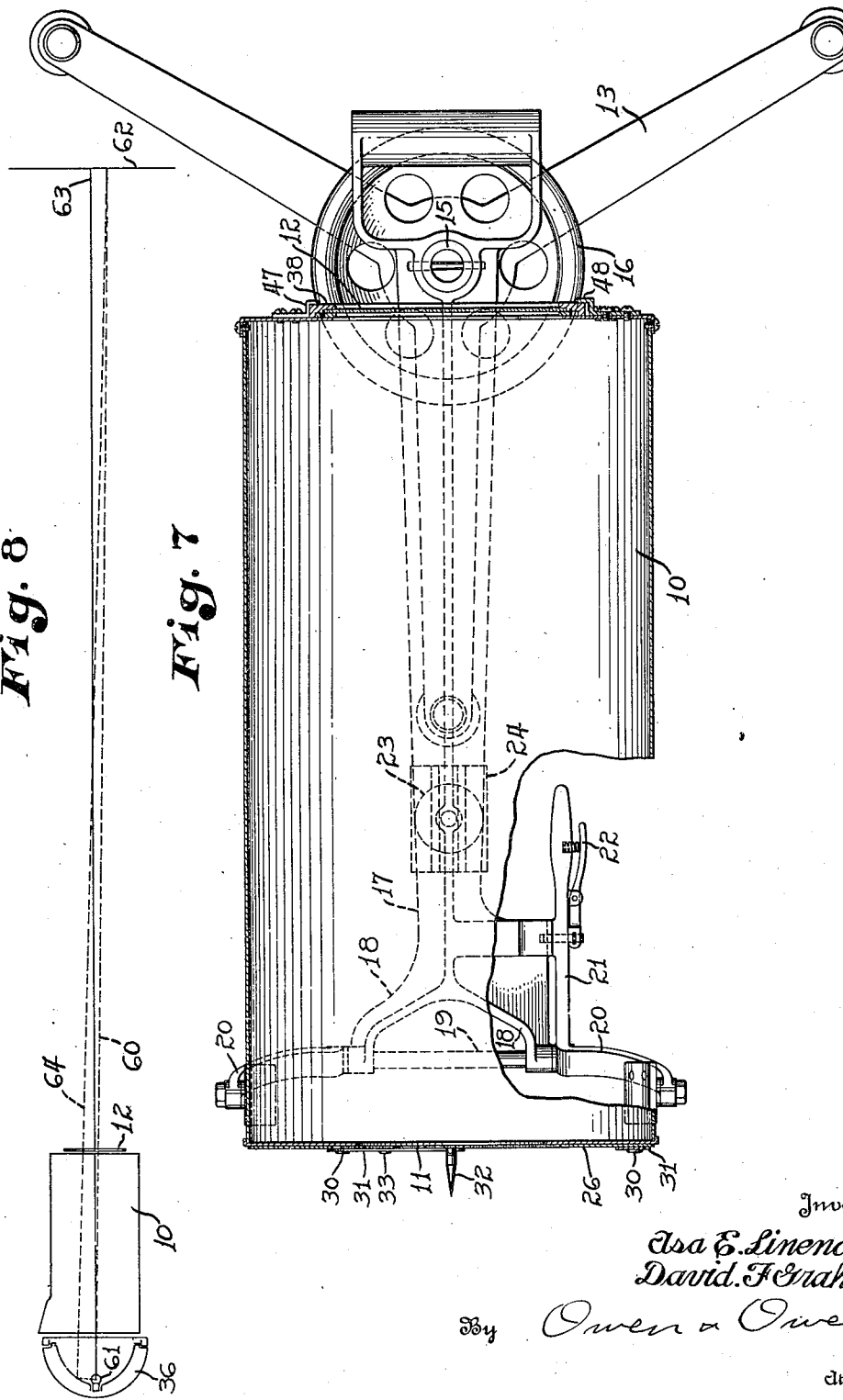

Patented Jan. 15, 1935

1,987,692

UNITED STATES PATENT OFFICE 1,987,692

LIGHT TESTING APPARATUS

Asa E. Linendoll and David F. Graham, Norwalk, Ohio, assignors, by mesne assignments, to Guide Lamp Corporation, Anderson, Ind., a corporation of Delaware Application May 6, 1929, Serial No. 360,968

7 Claims. (Cl. 88—14)

This invention relates to light testing apparatus and more particularly to apparatus for testing automobile headlights.

The purpose of the invention is to provide readily transportable apparatus taking up small space and adapted to be moved into operative relation with the headlight of an automobile and to enable the testing of the headlights.

The purpose of the testing is two-fold. With many headlights, it is desirable to adjust the bulb so that it will be properly focused within the reflector. The apparatus is provided with means for determining when the bulb is properly focused in the headlight.

It is always desirable and in many States required by law that the light shall be directed downward at a predetermined angle so that it will normally strike the road at a predetermined distance ahead of the automobile. It is an object of the apparatus constituting the subject matter of this invention to provide means for readily determining the angle at which the major portion of the light proceeds from the headlight.

Minor objects and details of the invention will appear as the description proceeds.

Figure 1:
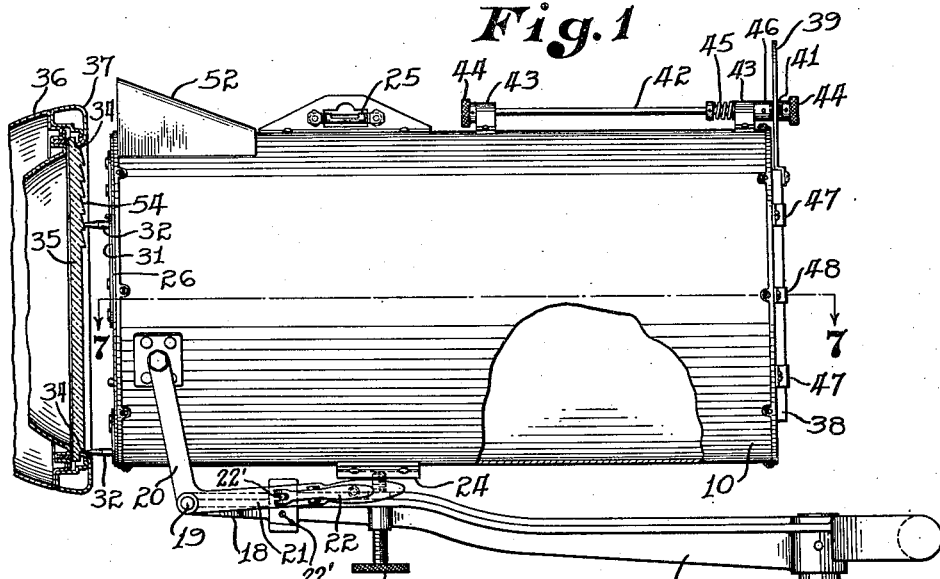
Figure 2:
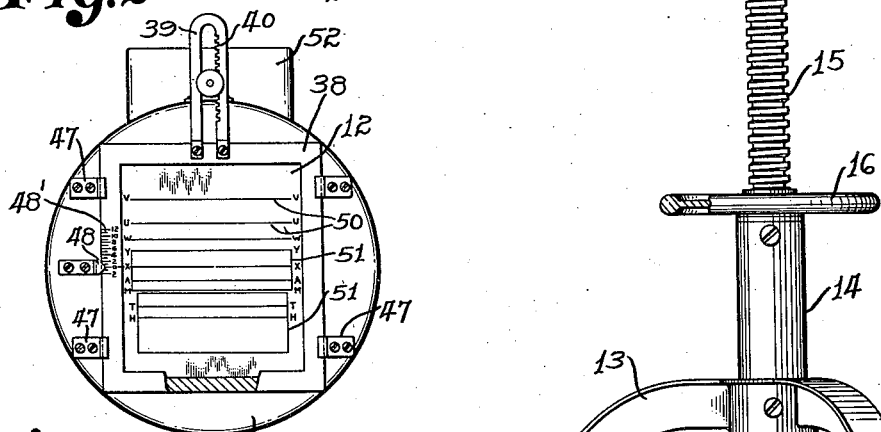
Figure 3:
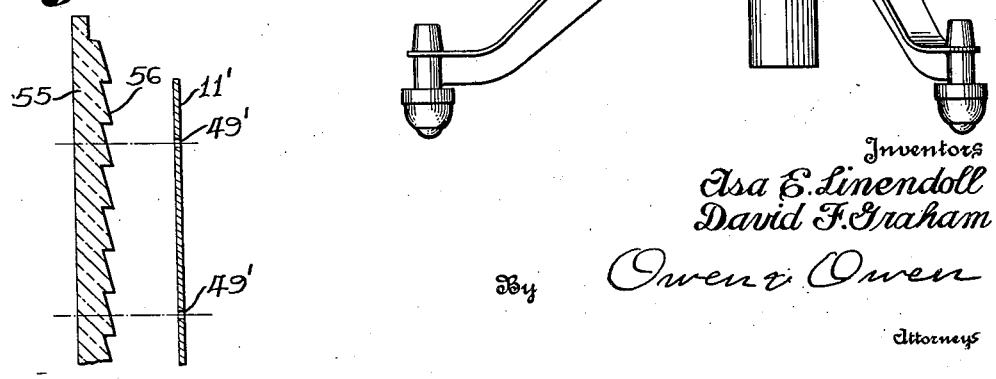

In the accompanying drawings forming a part of this specification, Figure 1 is a side elevation of apparatus embodying one form of the invention, with parts broken away and showing the apparatus in operative relation with the front of a headlight; Fig. 2 is an end elevation of the casing viewed from the right of Fig. 1; Fig. 3 is a somewhat diagrammatic view indicating the relation of the lens of a headlight and the shield of the casing when the headlight is being tested; Fig. 4 is an elevation on an enlarged scale of the left end of the casing as viewed in Fig. 1; Figs. 5 and 6 are detail sections on the lines 5—5 and 6—6, respectively, on Fig. 4; Fig. 7 is a horizontal section on the line 7—7 of Fig. 1, with parts broken away; Fig. 8 is a diagrammatic view illustrating the operation of the testing apparatus.

The testing device illustrated in the drawings comprises a supporting and spacing device, preferably in the form of a cylindrical casing 10 adapted to exclude light and provided with a shield 11 in one end and a screen 12 at the other end. A movable base 13 is provided with a post 14 in which a screw 15 may be adjusted vertically by a hand wheel 16. To the top of screw 15 there is attached an arm 17. At the end of arm 17 there is a fork 18 in which there is mounted a rock shaft 19. The ends of rock shaft 19 carry arms 20, the outer ends of which are pivoted to the sides of the casing. One of the arms 20 is continued horizontally to form a lever 21 having a latch 22 adapted to hold the lever in adjusted position. Two pins 22' are shown with which the end of latch 22 may engage alternately to hold arm 21 in its upper or lower position. A screw 23 is adjustable vertically through arm 17 against an abutment plate 24 on the bottom of the casing. The upper side of the casing is provided with a level 25.

On the end of the casing carrying shield 11, there is a ring 26 having thereon a handle 27 and provided with sets of slots 28 and 29. Through each slot 28 there projects a pivot member 30 mounted on the casing and having mounted thereon outside of ring 26 an arm 31 carrying a pin 32. A stud 33 on the inner face of arm 31 projects slidably through slot 29.

It will be readily seen that pins 32 are positioned symmetrically about the axis of the casing and that when ring 26 is oscillated pins 32 are swung simultaneously and equally towards or from the center of the casing. In Fig. 4, the movement of the upper left hand pin is illustrated in dotted lines. It will be readily seen that the pins may be moved in or out so that they will be the right distance apart to fit against the beveled edge 34 of the lens 35 of a headlight 36, and preferably immediately inside of rim 37 of the headlight. Hand wheel 16 may be adjusted upward or downward until the casing is on the proper level with respect to the headlight and screw 23 may be adjusted until all of the pins bear equally against the headlight.

At the end of the casing opposite the headlight, there is a vertically adjustable frame 38 carrying screen 12. A U-shaped member 39 projects from the upper side of frame 38 and has on one of its arms a rack 40 with which there meshes a gear 41 on a rod 42. Rod 42 is mounted in brackets 43 on the upper side of the casing and is provided at its ends with knurled members 44 by which the rod may be turned from either end. In the construction shown, there is provided a spring 45 about rod 42 drawing collar 46 into tight frictional engagement with one of the brackets 43 so that rod 42 stays in adjusted position. Frame 38 is movable vertically in slideways formed by ears 47 on the end of the casing. A pointer 48 on the casing overlies the edge of frame 38 and there is a series of markings 48' on the edge of the casing to indicate its vertical position.

Screen 11 is provided with slots 49 through which light may pass from the headlight into the casing. A series of horizontal lines 50 is provided on the screen and preferably the ends of some of these lines are connected by vertical lines 51 so as to form rectangles. These different lines are indicated on the screen by reference characters which are illustrated as being capital letters, such letters being chosen as appear the same from both sides of the screen. On the upper side of the casing above the shield there is an outwardly bent portion 52 of the wall of the casing which provides an opening 53 through which the side of the screen towards the shield can be inspected.

When a light is to be tested for focal position of the bulb, it will be readily understood that movable frame 13 is moved to position the casing in front of the headlight. The casing is then adjusted vertically by hand wheel 16 and angularly by screw 23 until it is in proper elevation and horizontal alignment with respect to the headlight. Pins 32 are adjusted to fit against the headlight, preferably at the bevel of the glass next to the rim, and these pins readily indicate when the casing is in proper position with respect to the lens.

The shield 11 which has been placed upon the casing will be the one suitable for the particular make of lens on the headlight which is to be tested. The shield is provided with two slits 49, as mentioned above, which are elongated horizontally and are spaced vertically. Otherwise these slits may be placed in front of any portion of the lens provided that they come where the light from the lens is intended to concentrate and form a bright beam. Certain lenses on the market have portions which throw a part of the light down, for example, while other portions of the lens concentrate the light at the place on the road where greatest illumination is desired in normal driving. The slots in the shield should be so positioned that they receive light which is intended to be concentrated in this bright beam. In the example given in Figs. 1 and 4, the lens is provided with prisms 54 at its upper part which are intended to throw the light down, while the major portion of the lens is substantially plane, and slits 49 in the shield 11 used with this lens are arranged to come opposite the plane portion of the lens.

In the example given in Fig. 3, a lens 55 is being tested, which is covered with prisms 56. In this case the slits 49' in the shield 11' are arranged so that they come intermediate the angles of ribs 56. If the slits should come directly in front of angles 56, the results might not be reliable because the beam passing through just at the angle of the rib is apt to be diverted from the direction in which the main portion of the beam is thrown.

When the light passing through slits 49 strikes shield 12, the focal position of the bulb is indicated by the position of these lines of light with respect to the horizontal lines on the screen. With different lenses and with different shields 11, the slits will be at different elevations and for this reason the plurality of horizontal lines are provided on the screen. A chart may be provided with the apparatus indicating which shields are to be used with different makes of lenses and which horizontal lines are to be considered in determining the proper position of the bulb in the particular lamp being tested. For example, if the light from the slits 49 in the particular shield 11 being used should form lines of light substantially on lines XX and TT, respectively, on the screen in order to focus at the proper distance, it will be readily understood that if the lines are below their proper position on the screen the bulb requires lowering, and if the lines are above their proper position on the screen, the bulb should be raised. Likewise, if the lines of light are too close together on the screen, the bulb should be moved forward with respect to the reflector and if the lines of light are too far apart on the screen, the bulb should be moved backward with respect to the reflector. In this way, the apparatus readily indicates whether or not the bulb is in proper position and also indicates exactly how the bulb should be moved to place it in proper focal position.

Many of the headlights now being put out are so arranged that there is little opportunity or necessity for adjusting the lamps in the reflectors for focusing; but the proper tilt of the headlight to throw the light on the road at the proper distance ahead and to avoid throwing any of the beams of light upward, requires frequent inspection.

If both the focusing and the tilting of the headlight is to be tested, the focusing is tested first, as described above. After the bulb has been properly focused, lever 21 is swung down to its lower position, thereby moving the casing away from the lens sufficiently to free the centering pins from contact with the lamp. Thereafter, screw 23 is adjusted to level the casing, which position is indicated by level 25. Screen 12 is adjusted in accordance with the make of the car and the law of the particular State where the test is applied. Marks 48' may be conveniently spaced and designated so as to indicate the drop in the light at 25 feet distance. In the example shown in Fig. 2, the mark 2 indicates that when the frame is set so that pointer 48 is in alignment with this mark, the screen is in the position for testing the proper tilt of the light to indicate that the beam shall not rise over a line two inches lower than the lamp twenty-five feet therefrom, and the other marks are similarly indicated. If the particular State law refers to seventy-five feet, for example, the proper adjustment may be calculated by multiplying the numbers indicated on the frame by three, as the light will drop three times as much in seventy-five feet as it does in twenty-five feet. It will be readily understood that the position of the marks on the frame is calculated on this same principle, that is, that the drop of the light in twenty-five feet will be proportional to its drop passing through the length of the casing, and that, for correct results, the automobile the lights of which are being tested should be on a level floor.

The same lines on the screen which were employed to indicate the proper focusing may be conveniently employed to indicate the tilt of the lamp, since light from slots 49 should fall on screen 12 so that they do not illuminate this screen above the respective line utilized in focusing.

To aid in fully understanding the operation of the device, a diagrammatic view has been added. In Fig. 8 there is shown a headlight 36 with casing 10 properly positioned in front thereof. It will be noted that in this case the beams employed are from the center and from above the center, respectively, instead of being from the center and below the center as shown in Fig. 4. It will be readily understood that the principle is the same. The central beam 60 from lamp bulb 61 passes through the appropriate slot in the particular shield 11 employed and if the beam was projected horizontally, it would fall on line XX on the screen when pointer 48 indicated line zero and the casing was level. If the required drop is two inches in twenty-five feet, for example, frame 38 is lowered until pointer 48 indicates line 2 on the frame and then when the light from beam 60 does not rise above line XX on the screen it will be evident that the beam would strike a wall 62 at twenty-five feet distance from the lamp two inches below the point where horizontal line 63 from the lamp would strike the wall.

For proper tilting of the light, it is not necessary to have more than the one slot, and this may be at any desired point where it will receive light which the particular lens concentrates in its brightest beam. In Fig. 8 there is indicated the use of a higher beam 64 which is directed at such an angle that it will strike wall 62 at the same point as beam 60. This is indicated on the screen by the position of the upper line thereon. For example, with slots properly positioned in the particular shield 11 employed, the upper beam might be directed to line UU when the central beam was directed to line XX, in order to focus properly. The approach of the two beams to each other between shield 11 and screen 12 obviously is proportional to their approach during the distance from the lamp to the wall on which they should be focused. If the focus is desired at a different distance, the lines on the screen must be positioned in accordance with this desire.

It may frequently happen that it is desired to test the tilt of the lamp when the question of its focus does not require investigation. In such a case the casing is merely leveled in front of the light, without contact therewith but at such a height that the slots in the particular shield 11 employed will receive light from portions of the lens which are intended to concentrate the light in a bright beam. The tilt of the light may then be adjusted until the beams strike the screen at the proper point, as indicated by the adjustment of the screen in accordance with the chart arranged for the particular situation being tested.

The preferred construction includes a screen 12 which is transparent or translucent and has lines designated by characters which appear the same from both sides of the screen so that if the chart indicates that the lines of light should correspond with any particular lines on the screen or should fall within certain rectangles on the screen, the accuracy of the focusing and tilt may be ascertained by viewing the screen either from the front or through peep-hole 53. Ordinarily, where one man alone is using the tester, it is more convenient to observe the screen through peep-hole 53, adjacent the light where adjustments must be made. When the apparatus is intended for use by one man only, the screen may be made of opaque material and viewed only through peep-hole 53. This operation has the advantage of more perfectly shielding the screen from outside light so that the lines are readily visible thereon. Where a transparent or translucent screen is employed, a cloth or other shield may be employed thereover when the intensity of outside light renders it necessary or desirable.

Where lamps are to be tested which employ two adjacent filaments, one for the bright light and one for the dim light, it is convenient in focusing to first focus the bright light and then lower the bulb sufficiently to bring the exact focus between the two filaments. The leveling should then take place with respect to the bright light and after the filament of the bright light has been adjusted to its final position.

It will be readily understood that various departures may be made from the exact structure disclosed, within the scope of the appended claims.

What we claim is:

1. In apparatus for testing an automobile head-light, a supporting and spacing device adapted to be placed in front of a light, a shield on the end of said device next to the light having therein a horizontal slot, means for adjusting the device vertically, a level on the device, means for tilting the device to level the same in the direction of the light from said head-light, a screen on the other end of the device, and a horizontal line on said screen.

2. In apparatus for testing an automobile head-light, a supporting and spacing device adapted to be placed in front of a light, a shield on the end of said device next to the light having therein a horizontal slot, means for adjusting the device vertically, a level on the device, means for tilting the device to level the same in the direction of the light from said head-light, a screen on the other end of the device, a horizontal line on said screen, means for adjusting the screen vertically relative to the device, and means indicating the height of the line on the screen relative to the slot in the shield.

3. An automobile head-light tester, comprising a casing adapted to be placed in front of a light, a shield on the end of the casing next to the light having two horizontal slots therein, one above the other, and a screen on the other end of the casing having horizontal lines thereon, one above the other, and a distance apart vertically relative to the vertical distance apart of said slots proportionate to the distance between said screen and a desired focal point of the beam and the distance of the shield from said desired focal point, and a peep-hole beside said shield into the casing through which the screen may be observed.

4. A focusing device for a head-light comprising a casing, a support, means mounting the casing adjustably on the support, means on one end of the casing for indicating when it is centered with respect to a head-light lens, an opaque plate at said end of the casing, said plate having parallel horizontal slots therein, and a screen in the other end of the casing having horizontal lines thereon, said casing having an opening in its side adjacent said plate and through which said screen may be observed.

5. A casing provided with means for indicating the focal length of a head-light when the axis of the casing is in alignment with the axis of the head-light, members projecting from said casing symmetrically about its axis and adapted to engage the rim of the lens of a headlight, and means for simultaneously adjusting said members towards or from the axis of the casing.

6. In a head lamp tester, a support, a supporting and spacing device mounted on the support, means on the end of the device adapted to contact with a headlight and indicate the alignment of the device with the headlight, means for adjusting the device vertically on its support, means for tilting the casing on its support, and means for moving the device substantially longitudinally on the support.

7. In apparatus for testing automobile head-lamps and the like, the combination of a testing device adapted to be positioned in front of a head-lamp, members projected from said device symmetrically about its axis and adapted to engage the headlamp to align the device with the lamp, and means for simultaneously adjusting said members toward and from the axis of the lamp.

ASA E. LINENDOLL.
DAVID F. GRAHAM.